US010638008B2

(12) United States Patent
Heineck et al.

(10) Patent No.: US 10,638,008 B2
(45) Date of Patent: Apr. 28, 2020

(54) EDGE DETECTION USING AN INVISIBLE SPECTRUM SCAN

(71) Applicant: Hewlett-Packard Development Company, L.P., Houston, TX (US)

(72) Inventors: John Michael Heineck, Boise, ID (US); Tiffany L Greyson, Boise, ID (US); Derek Wade, Boise, ID (US); Tyelisa C Shields, Boise, ID (US); Adam Greystone, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,530

(22) PCT Filed: Jul. 21, 2016

(86) PCT No.: PCT/US2016/043246
§ 371 (c)(1),
(2) Date: Oct. 29, 2018

(87) PCT Pub. No.: WO2018/017087
PCT Pub. Date: Jan. 25, 2018

(65) Prior Publication Data
US 2019/0141207 A1    May 9, 2019

(51) Int. Cl.
*G06K 15/02*   (2006.01)
*H04N 1/00*    (2006.01)
*H04N 1/10*    (2006.01)

(52) U.S. Cl.
CPC ........... *H04N 1/00748* (2013.01); *H04N 1/00* (2013.01); *H04N 1/00689* (2013.01); *H04N 1/1061* (2013.01); *H04N 1/1065* (2013.01)

(58) Field of Classification Search
USPC .......................................................... 358/497
See application file for complete search history.

(56) References Cited

U.S. PATENT DOCUMENTS 5,764,380 A * 6/1998 Noguchi ............ H04N 1/00681
358/449
6,883,983 B2    4/2005 Kobayashi
(Continued)

FOREIGN PATENT DOCUMENTS

EP    2743863 A1    6/2014
JP    7179001       7/1995

OTHER PUBLICATIONS

Azuma, et al., The Single Emission Spectrum Densitometry for Radiochromic Films by Flat-bed Document Scanner with Transparency Unit Employing Light Emitting Diode, May 2008 IEEE—2 pages.

*Primary Examiner* — Dung D Tran
(74) *Attorney, Agent, or Firm* — Tong, Rea, Bentley & Kim LLC (57) ABSTRACT

In an example, an apparatus is described that includes a transparent platen, a substrate, an array of light sources, and a sensor. The substrate is positioned on one side of the platen and has substantially uniform reflective properties. The array of light sources is positioned on an opposite side of the platen from the substrate and includes a plurality of light sources that emits light in a visible spectrum and a light source that emits light in an invisible spectrum. The sensor is positioned on the opposite side of the platen from the substrate and detects reflected portions of the light in the visible spectrum and the light in the invisible spectrum.

11 Claims, 6 Drawing Sheets

(56) References Cited

U.S. PATENT DOCUMENTS

| | | | |
|---|---|---|---|
| 7,548,355 B2* | 6/2009 | Nagano | H04N 1/00795 |
| | | | 358/406 |
| 7,796,310 B2* | 9/2010 | Hasegawa | H04N 1/00681 |
| | | | 358/408 |
| 8,593,707 B2* | 11/2013 | Tanimura | H04N 1/00846 |
| | | | 358/518 |
| 8,654,414 B2 | 2/2014 | Han et al. | |
| 8,705,146 B2 | 4/2014 | King et al. | |
| 9,071,720 B2 | 6/2015 | Ikari et al. | |
| 2005/0063025 A1* | 3/2005 | Hayashide | H04N 1/00002 |
| | | | 358/497 |
| 2005/0275908 A1* | 12/2005 | Nogami | H04N 1/02815 |
| | | | 358/497 |
| 2011/0122458 A1 | 5/2011 | Do et al. | |
| 2012/0033246 A1* | 2/2012 | Unno | H04N 1/0071 |
| | | | 358/1.14 |
| 2012/0287484 A1* | 11/2012 | Shimoda | H04N 1/02835 |
| | | | 358/475 |
| 2016/0100075 A1* | 4/2016 | Chen | H04N 1/04 |
| | | | 358/1.13 |

* cited by examiner

EDGE DETECTION USING AN INVISIBLE SPECTRUM SCAN

BACKGROUND

An image scanner is a device that optically scans a printed document or object and converts it into a digital image. In most flatbed-type scanners, the document is placed, face down, on a glass platen. An opaque lid or cover of the scanner is then lowered over the document to block ambient light, effectively sandwiching the document between the glass platen and the cover. Underneath the platen is a light source that illuminates the document and a sensor that senses the intensity and color of light reflected by the document. The document is then recreated in digital form from the intensity and color information.

DETAILED DESCRIPTION

The present disclosure broadly describes an apparatus, method, and non-transitory computer-readable medium for detecting an edge of a document using an invisible spectrum scan. As discussed above, many flatbed scanners include an opaque cover that is lowered over the document to be scanned, effectively sandwiching the document between the glass platen (under which the light source and sensor reside) and the cover. In many cases, the cover comprises a piece of plastic that is relatively close in color to a piece of white paper. If the cover was significantly darker in color than the document to be scanned, the darker color could bleed through the document when illuminated and compromise the quality of the digital image.

While lighter colored covers are less likely to bleed through the document, the reduced color contrast between the document and the cover in the visible light spectra used to scan the document makes it more challenging to identify the edges of the document in the scanned data. Edge detection can be used to adjust the orientation of the digital image to correct for skew of the document on the platen. It can also be used to infer the size of the document. In addition, edge detection can allow multiple documents to be scanned simultaneously, but saved as separate digital image files. Thus, there are advantages to facilitating edge detection.

Examples of the present disclosure generate an increased contrast image of a document and background scanner cover by scanning in an invisible (i.e., invisible to the human eye) spectrum. The invisible spectrum is one in which there is a greater difference in the reflectance and absorbance of the light between the paper document and the plastic cover (e.g., infrared or ultraviolet). The invisible spectrum scan may be performed simultaneously with the visible spectrum scan of the document, or may be performed as a separate scan. The result of the invisible spectrum scan is a digital image, separate from the digital image recreating the document, exhibiting a greater contrast between the document and the cover. From this digital image, edge detection software can reliably detect the edges of the document.

Figure 1A:
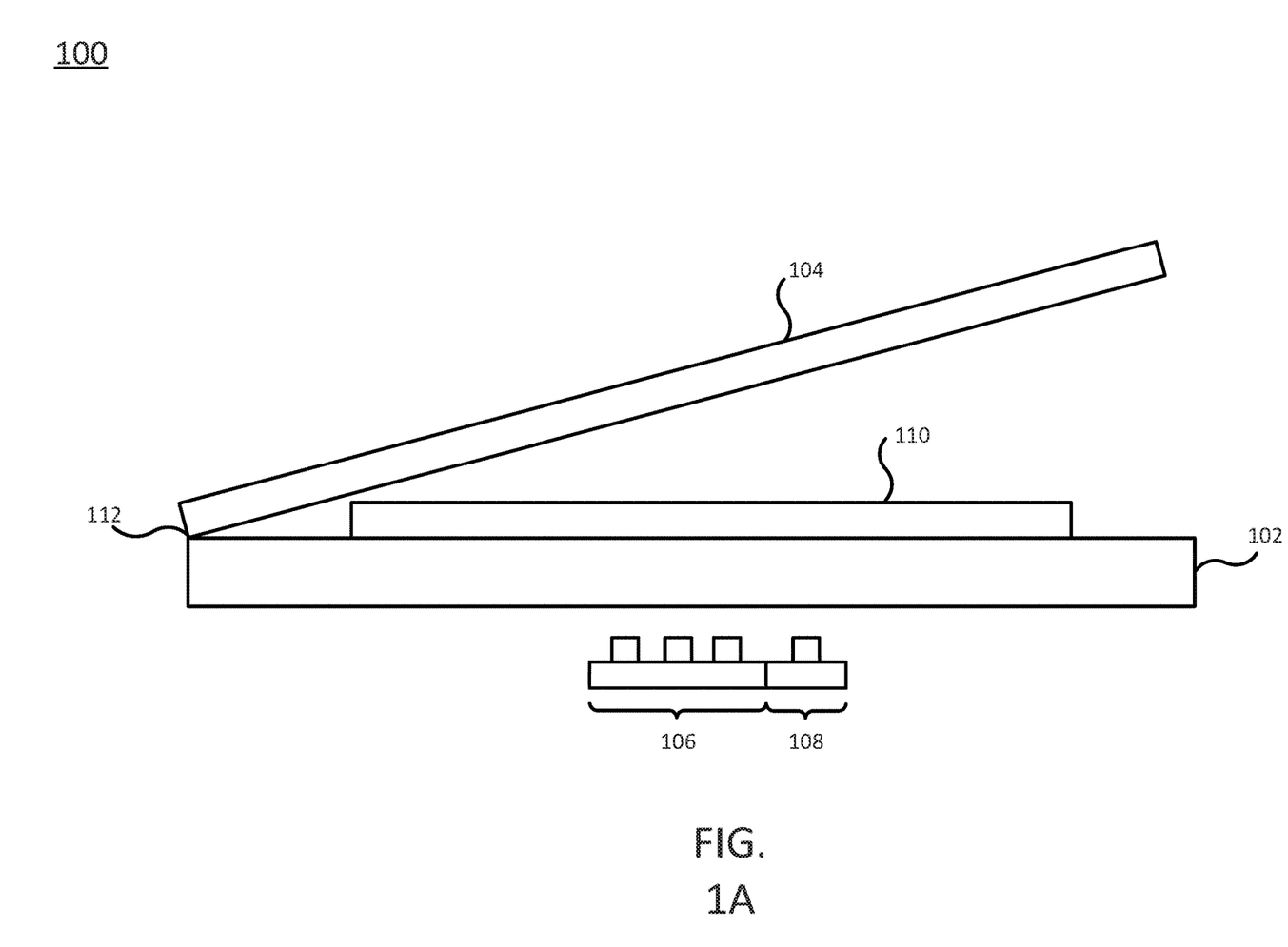
FIG. 1A illustrates a first example system of the present disclosure.
Figure 1B:
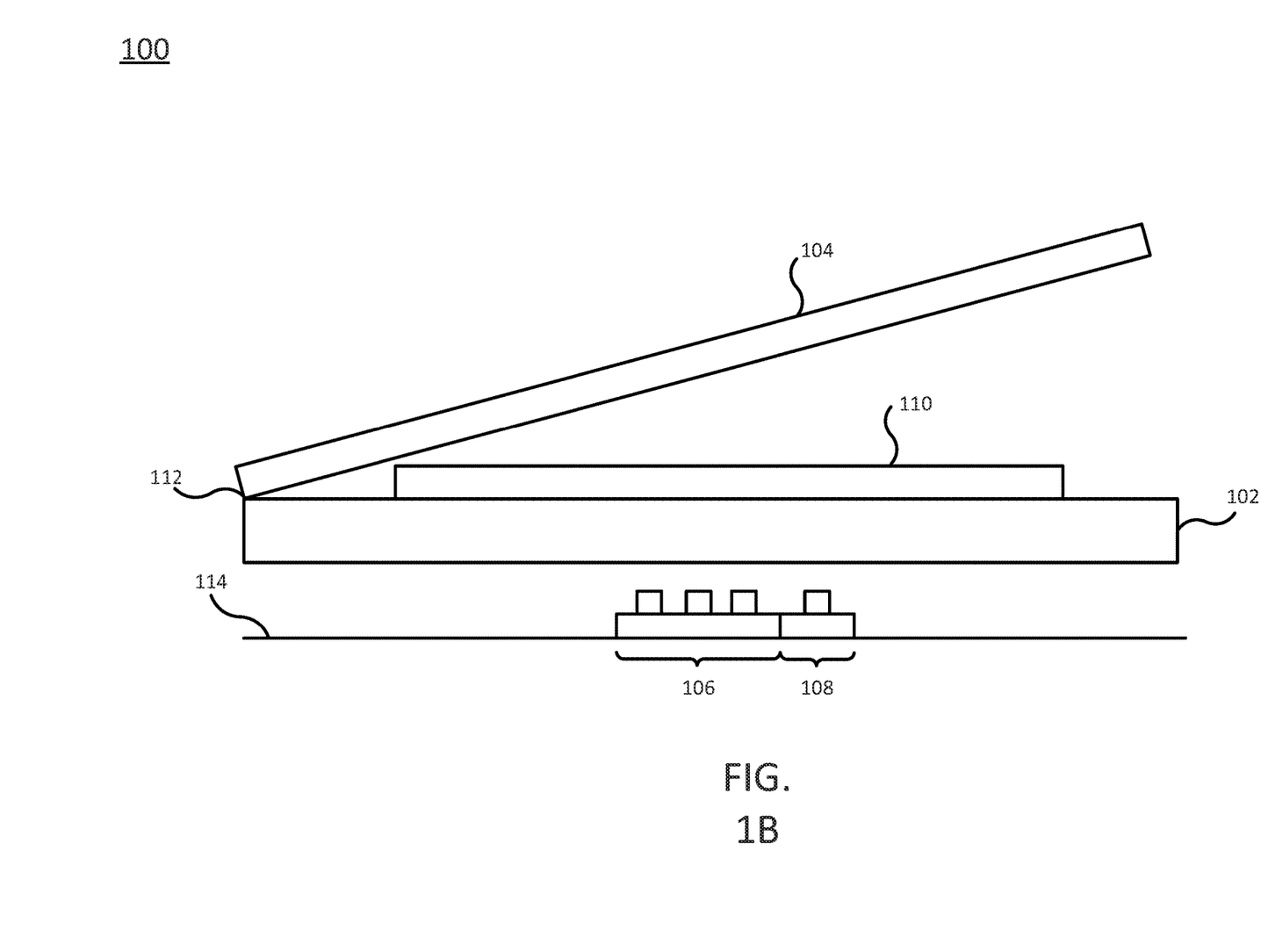
FIG. 1B illustrates a second example system of the present disclosure.

FIG. 1A illustrates a first example system 100 of the present disclosure, while FIG. 1B illustrates a second example system 100 of the present disclosure. In particular, FIG. 1B is nearly identical to FIG. 1A, except that FIG. 1B includes a track 114 which is described in greater detail below. With respect to all other elements of the figures, the following discussion may apply to both FIG. 1A and FIG. 1B.

In one example, the system 100 is a scanning device, such as a flatbed scanner. The system 100 generally includes a platen 102, a cover 104, a visible spectra light source 106, and an invisible spectrum light source 108. The platen 102, cover 104, and light sources 106 and 108 work together, possibly in conjunction with other components, to convert a document 110 into a digital image.

The platen 102 comprises a plate of transparent material, such as glass. The platen 102 may include markings for guiding a user in placing the document 110 on the platen 102.

The cover 104 comprises a substrate of opaque material, such as plastic, that is positioned over a first side of the platen 102. In one example, the opaque material has substantially uniform reflective properties, at least on the side that faces the platen 102. That is, the portions of the opaque material facing the platen 102 reflect light in a uniform manner, allowing for some minor, unintentional variations in the reflective properties that might be introduced through manufacturing, wear, or other means. Thus, the opaque material may be solid in color. In a further example, the solid color is a relatively light color, such as a shade of white. In another example, the cover 104 comprises a material whose darkness can be changed on demand according to the needs of a particular scanning application. For instance, the cover 104 could comprise a liquid crystal display or electronic ink screen, a material whose reflectivity changes with temperature, or a material that changes color with an applied voltage. However, at any given time, the reflective properties of the cover 104 at that given time remain substantially uniform. The cover 104 may be coupled to the platen 102 or near the platen 102 by a hinge 112.

The visible spectra light source 106 is positioned on the opposite side of the platen 102 from the cover 104, e.g., such that the visible spectra light source 106 emits light through the platen 102 and toward the document 110 and cover 104. The visible spectra light source 106 comprises an array of emitters that emit light in various wavelengths (e.g., red, green, and blue). The emitters may comprise, for example, light emitting diodes (LEDs). In addition, the visible spectra light source 106 may further include a sensor (e.g., a charge coupled device) for detecting light that is emitted by the array of emitters and reflected back by the document 110 and cover 104. Alternatively, the sensor may comprise a component that is physically separate from the emitters of the visible spectra light source 106, such that the light reflected back by the document 110 and cover 104 reaches the sensor via a series of mirrors or other optics (not shown). In one example, the visible spectra light source 106 moves in two directions along the track 114 (shown in FIG. 1B) that is approximately as long as the platen 102. In other examples, the visible spectra light source 106 may move by other means.

The invisible spectrum light source 108 is also positioned on the opposite side of the platen 102 from the cover 104, e.g., such that the invisible spectrum light source 108 emits light through the platen 102 and toward the document 110 and cover 104. The invisible spectrum light source 108 comprises one or more emitters that emit light in one or more invisible wavelengths (e.g., infrared or ultraviolet). The emitters may comprise, for example, LEDs. In addition, the invisible spectrum light source 108 may further include a sensor (e.g., an image capturing device, a charge coupled device, or the like) for detecting light that is emitted by the emitter(s) and reflected back by the document 110 and cover 104. Alternatively, the sensor may comprise a component that is physically separate from the emitters of the invisible spectrum light source 108, such that the light reflected back by the document 110 and cover 104 reaches the sensor via a series of mirrors or other optics (not shown). In yet another example, the same sensor that detects the light emitted by the emitters of the visible spectra light source 106 also detects the light emitted by the emitters of the invisible spectrum light source 108. In this case, the sensor would omit hardware filters that might otherwise be used to filter out invisible wavelengths of light.

In one example, the invisible spectrum light source 108 moves in two directions along the track 114 (shown in FIG. 1B). In other examples, the invisible spectrum light source 108 may move by other means. In either case, the invisible spectrum light source 108 may be physically coupled to (e.g., positioned on a common base with) the visible spectra light source 106, such that the invisible spectrum light source 108 and the visible spectra light source 106 move together, e.g., along the track 114. Alternatively, the invisible spectrum light source 108 may move (e.g., along the track 114) independently of the visible spectra light source 106, or may move along a separate conveyance (e.g., a separate track) altogether.

In operation, the document 110 to be scanned is placed, face down, on the platen 102, so that any images (text, pictures, etc.) face toward the visible spectra light source 106 and the invisible spectrum light source 108. The cover 104 is then placed over the document 110 to block ambient light. When scanning is initiated, the visible spectra light source 106 and the invisible spectrum light source 108 slide along the track 114, emitting light as they move to illuminate the length of the document 110. The document 110 and the portions of the cover 104 that are not obscured by the document 110 reflect the light emitted by the visible spectra light source 106 and the invisible spectrum light source 108, and the reflected light is detected by the sensors. The images of the document 110 are then recreated in digital form from the data detected by the sensors. In one example, one pass (e.g., one movement in one direction) of the visible spectra light source 106 and the invisible spectrum light source 108 is sufficient to collect enough data to recreate the images on the document 110.

In one example, the reflected light that originated from the visible spectra light source 106 is used to create a plurality of images (e.g., one image for each of the emitters) that are then combined to produce a single digital image recreating the document 110. The reflected light that originated from the invisible spectrum light source 108 is used to create a single image that is used, separately from the plurality of images corresponding to the visible spectra light source 106, to detect the edges of the document 110. Since the materials of the document 110 and the cover 104 (e.g., paper and plastic) exhibit different levels of electromagnetic absorbance when exposed to certain invisible wavelengths of light, the document 110 can be easily differentiated from the cover 104 in the image generated using the invisible spectrum light source 108. Moreover, the disclosed technique is effective even when the reflective properties of the cover 104 are substantially uniform, meaning that the appearance and composition of the cover 104 do not need to be altered for the technique to work.

Figure 2:
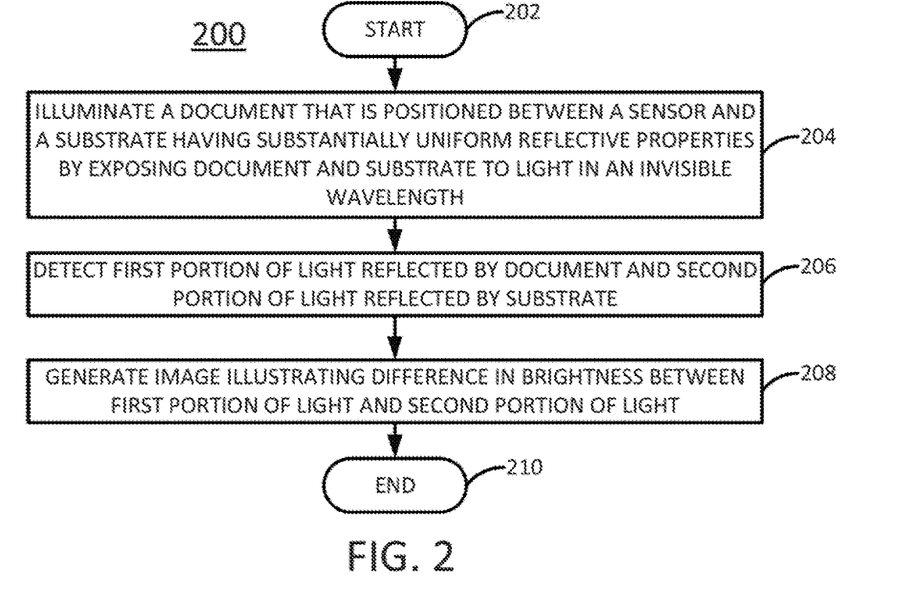
FIG. 2 illustrates a flowchart of a first example method for detecting an edge of a document being scanned.

FIG. 2 illustrates a flowchart of a first example method 200 for detecting an edge of a document being scanned. The method 200 may be performed, for example, by the system 100 illustrated in FIG. 1. As such, reference is made in the discussion of FIG. 2 to various components of the system 100 to facilitate understanding. However, the method 200 is not limited to implementation with the system illustrated in FIG. 1.

The method 200 begins in block 202. In block 204, a document that is positioned between a sensor (e.g., the sensor of the invisible spectrum light source 108) and a substrate having substantially uniform reflective properties (e.g., the cover 104) is illuminated. In one example, illuminating the document exposes the document and the substrate to light in an invisible wavelength (e.g., infrared or ultraviolet). In one example, the document is placed, face down, on a transparent platen (e.g., platen 102) that is positioned between the sensor and the substrate.

In block 206, the sensor detects a first portion of the light that is reflected by the document and a second portion of the light that is reflect by the substrate. In one example, the document and the substrate exhibit different levels of electromagnetic absorbance when exposed to the light, and so there will be a difference in the intensity or amount of the light reflected by the document and the light reflected by the substrate.

Figure 3A:
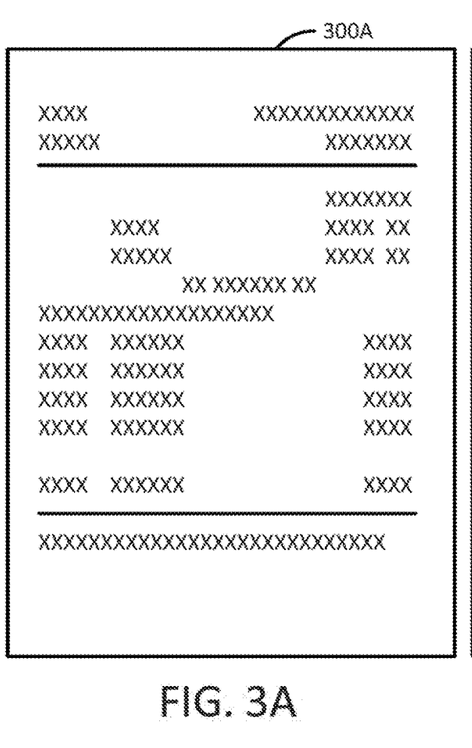
FIGS. 3A and 3B illustrate example images that may be generated by the system of FIG. 1.
Figure 3B:
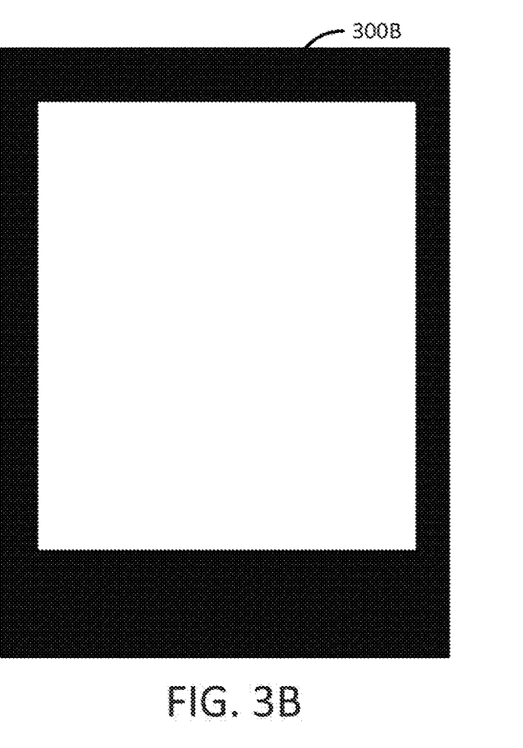

In block 208, the sensor generates an image that illustrates the difference in the brightness of the light reflected by the document and the light reflected by the substrate. FIGS. 3A and 3B, for instance, illustrate example images that may be generated by the system 100 of FIG. 1. In particular, FIG. 3A illustrates a first example image 300A generated using the visible spectra light source 106 of FIG. 1, while FIG. 3B illustrates a second example image 300B generated using the invisible spectrum light source 108 of FIG. 1. As illustrated in FIG. 3A, the document in the first example image 300A is visually indistinguishable from the cover behind it, although the text of the document is easily visible. In other words, the document and the cover reflect relatively similar amounts of the visible wavelengths of light. By contrast, the same document in the second example image 300B can be easily visually distinguished from the cover based on the differences in brightness (i.e., the cover in FIG. 3B absorbs more of the invisible wavelength of light than the document does). However, the text of the document may not be easily visible in the second example image 300B due to the loss of color (i.e., the scan using the invisible spectrum light source results in a greyscale image rather than a color image, so visibility of the text will depend on the absorbance of the printing fluid relative to the surface on which it is printed).

Figure 4:
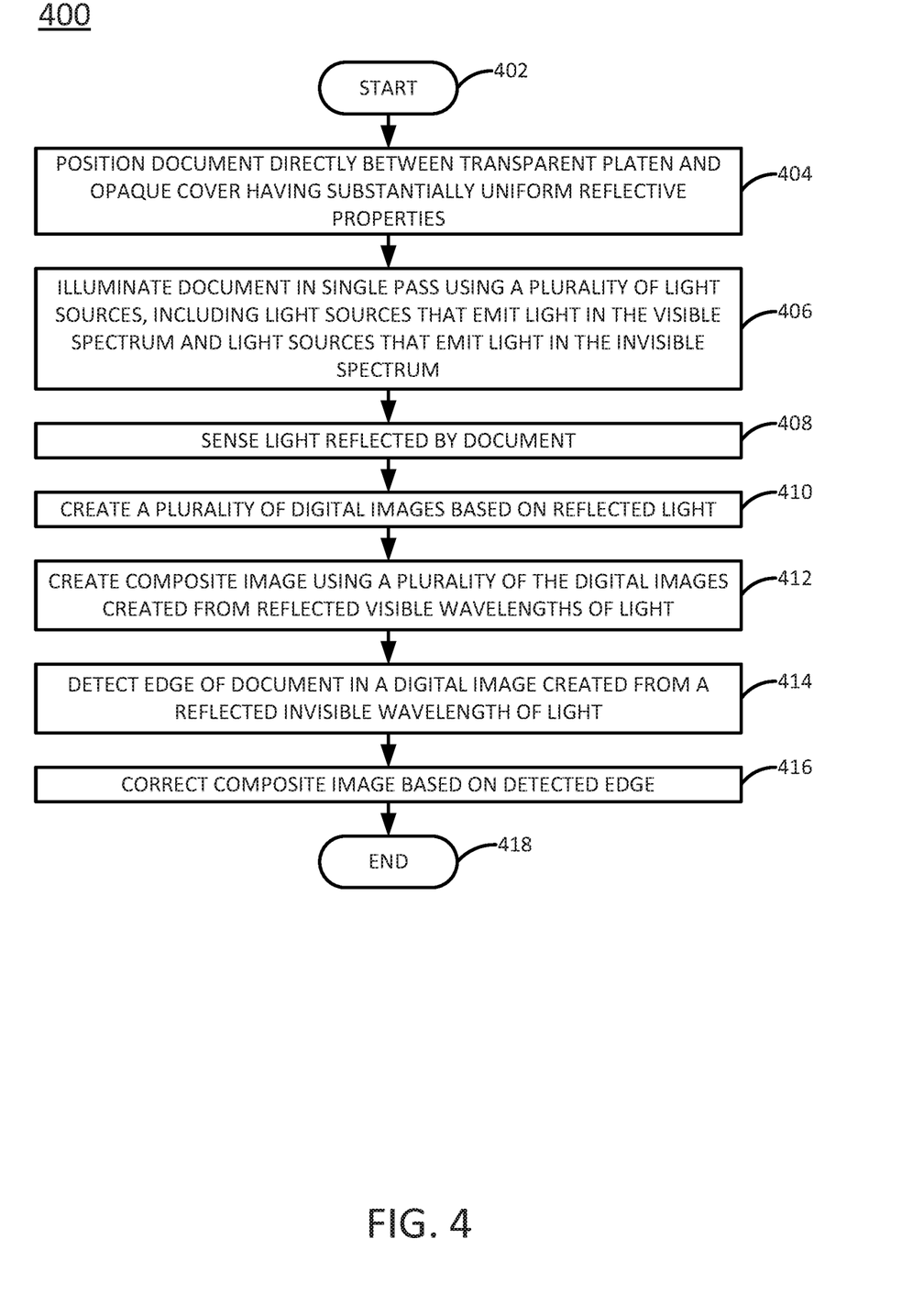
FIG. 4 illustrates a flowchart of a second example method for detecting an edge of a document being scanned.

FIG. 4 illustrates a flowchart of a second example method 400 for detecting an edge of a document being scanned. The method 400 is a more detailed variation of the method 200 illustrated in FIG. 2. The method 400 may be performed, for example, by the system 100 illustrated in FIG. 1. As such, reference is made in the discussion of FIG. 4 to various components of the system 100 to facilitate understanding.

However, the method 400 is not limited to implementation with the system illustrated in FIG. 1.

The method 400 begins in block 402. In block 404, a document is positioned directly between a transparent platen (e.g., platen 102) and an opaque cover (e.g., cover 104). In one example, the opaque cover comprises a plastic substrate having substantially uniform reflective properties, at least with respect to the side of the cover that faces the platen.

In block 406, the document is illuminated in a single pass using a plurality of light sources, including light sources that emit light in the visible spectrum and light sources that emit light in the invisible spectrum (e.g., visible spectra light source 106 and the invisible spectrum light source 108). By a single pass, it is meant that all of the light sources (i.e., both in the visible and invisible spectra) are used to illuminate the document at the same time, while traveling simultaneously in a single direction along the document's length (e.g., along track 114). Thus, the single pass may comprise either the out stroke or the return stroke of the scan.

In block 408, the light reflected by the document and by the cover is sensed by the sensors. In one example, a separate sensor senses the light of each wavelength that is reflected (e.g., such that one sensor senses red light, one sensor senses green light, one sensor senses blue light, one sensor senses infrared or ultraviolet light).

In block 410, a plurality of digital images are created based on the reflected light that is sensed in block 408. In one example, one digital image is created for each wavelength of light that is sensed (e.g., one image based on reflected red light, one image based on reflected green light, one image based on reflected blue light, one image based on reflected infrared or ultraviolet light).

In block 412, a composite image is created by combining a plurality of the digital images created from reflected visible wavelengths of light (e.g., red, green, and blue). The composite image depicts the document and a portion of the cover positioned behind and around the document. In one example, any text and images of the document are visible in the composite image; however the document may not be easily visibly distinguishable from the cover (e.g., as is the case in FIG. 3A).

In block 414, an edge of the document is detected using one of the digital images created from invisible wavelength of light that is sensed. This image depicts the document and a portion of the cover positioned behind and around the document. In one example, any text and images of the document are not easily visible in the image; however the document is easily visibly distinguishable from the cover (e.g., as is the case in FIG. 3B), making edge detection relatively straightforward.

In block 416, the composite image created in block 412 may be corrected based on the location of the detected edge detected in block 414. For example, the detected edge may be used to correct skew in the composite image, to detect the size of the document, or to identify separate documents on the platen that can be saved as separate image files.

The method 400 ends in block 418.

Figure 5:
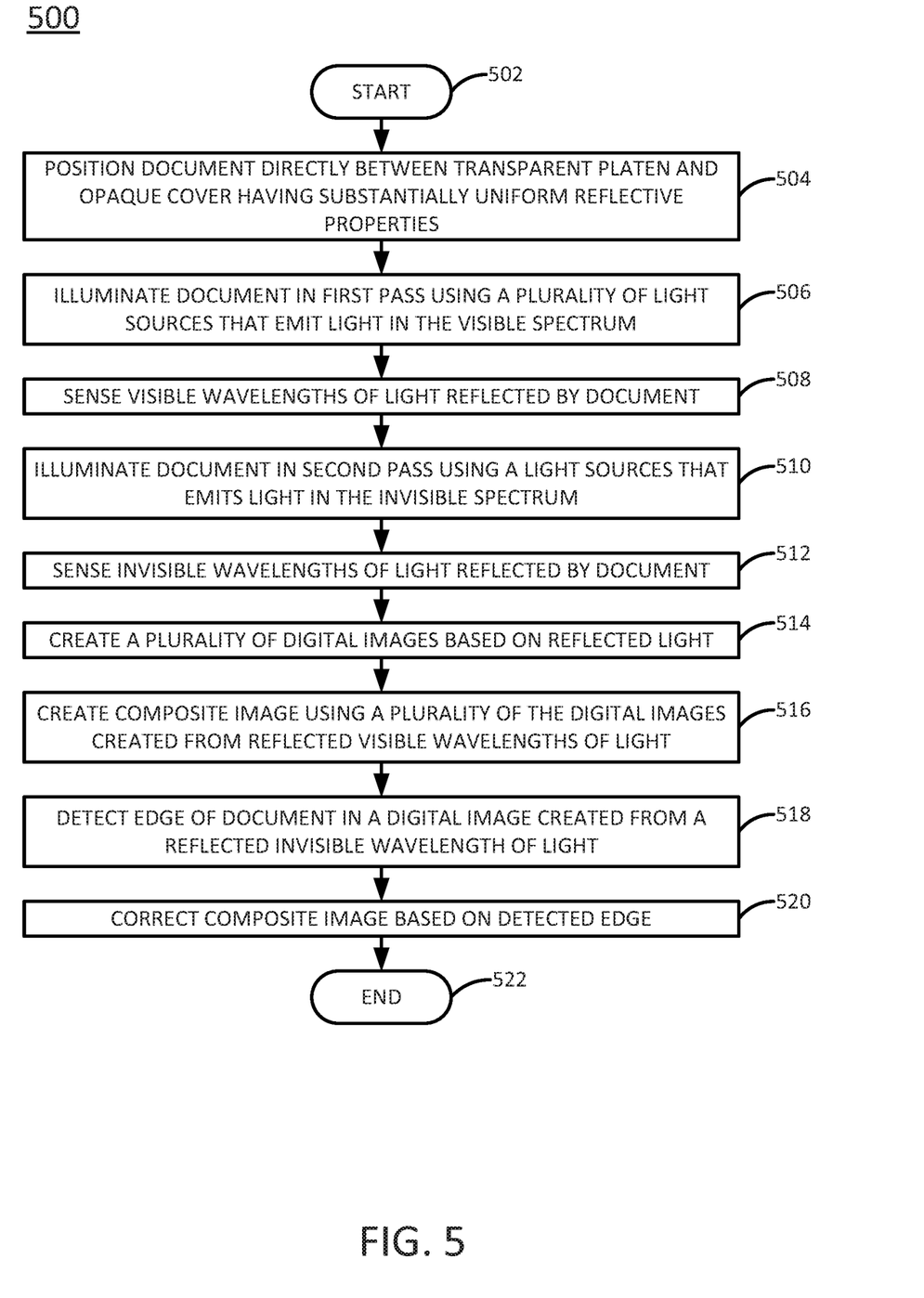
FIG. 5 illustrates a flowchart of a third example method for detecting an edge of a document being scanned.

FIG. 5 illustrates a flowchart of a third example method 500 for detecting an edge of a document being scanned. The method 500 is a more detailed variation of the method 200 illustrated in FIG. 2. The method 500 may be performed, for example, by the system 100 illustrated in FIG. 1. As such, reference is made in the discussion of FIG. 5 to various components of the system 100 to facilitate understanding. However, the method 500 is not limited to implementation with the system illustrated in FIG. 1.

The method 500 begins in block 502. In block 504, a document is positioned directly between a transparent platen (e.g., platen 102) and an opaque cover (e.g., cover 104). In one example, the opaque cover comprises a plastic substrate having substantially uniform reflective properties, at least with respect to the side of the cover that faces the platen.

In block 506, the document is illuminated in a first pass using a plurality of light sources that emit light in the visible spectrum (e.g., visible spectra light source 106). The first pass may be, for example, the out stroke of the scan.

In block 508, the light reflected by the document and by the cover during the first pass is sensed by the sensors. In one example, a separate sensor senses the light of each wavelength that is reflected (e.g., such that one sensor senses red light, one sensor senses green light, one sensor senses blue light).

In block 510, the document is illuminated in a second pass using a light source that emits light in the invisible spectrum (e.g., invisible spectrum light source 108). The second pass is a separate pass from the first pass. Thus, if the first pass comprises the out stroke of the scan, the second pass may comprise the return stroke.

In block 512, the light reflected by the document and by the cover during the second pass is sensed by the sensors. In one example, a dedicated sensor (i.e., different from the sensors used to sense the visible wavelengths of light in block 508) senses the light of the invisible wavelength that is reflected.

In block 514, a plurality of digital images are created based on the reflected light that is sensed in blocks 508 and 512. In one example, one digital image is created for each wavelength of light that is sensed (e.g., one image based on reflected red light, one image based on reflected green light, one image based on reflected blue light, one image based on reflected infrared or ultraviolet light).

In block 516, a composite image is created by combining a plurality of the digital images created from reflected visible wavelengths of light (e.g., red, green, and blue). The composite image depicts the document and a portion of the cover positioned behind and around the document. In one example, any text and images of the document are visible in the composite image; however the document may not be easily visibly distinguishable from the cover (e.g., as is the case in FIG. 3A).

In block 518, an edge of the document is detected using one of the digital images created for an invisible wavelength of light that is sensed. This image depicts the document and a portion of the cover positioned behind and around the document. In one example, any text and images of the document are not easily visible in the image; however the document is easily visibly distinguishable from the cover (e.g., as is the case in FIG. 3B), making edge detection relatively straightforward.

In block 520, the composite image created in block 516 may be corrected based on the detected edge detected in block 518. For example, the detected edge may be used to correct skew in the composite image, to detect the size of the document, or to identify separate documents on the platen that can be saved as separate image files.

The method 500 ends in block 522.

It should be noted that although not explicitly specified, some of the blocks, functions, or operations of the methods 200, 400, and 500 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 2 and 4-5 that recite a determining operation, or involve a decision, do not necessarily imply that both branches of the determining operation are practiced. In other words, one of the branches of the determining operation can be deemed to be optional.

Figure 6:
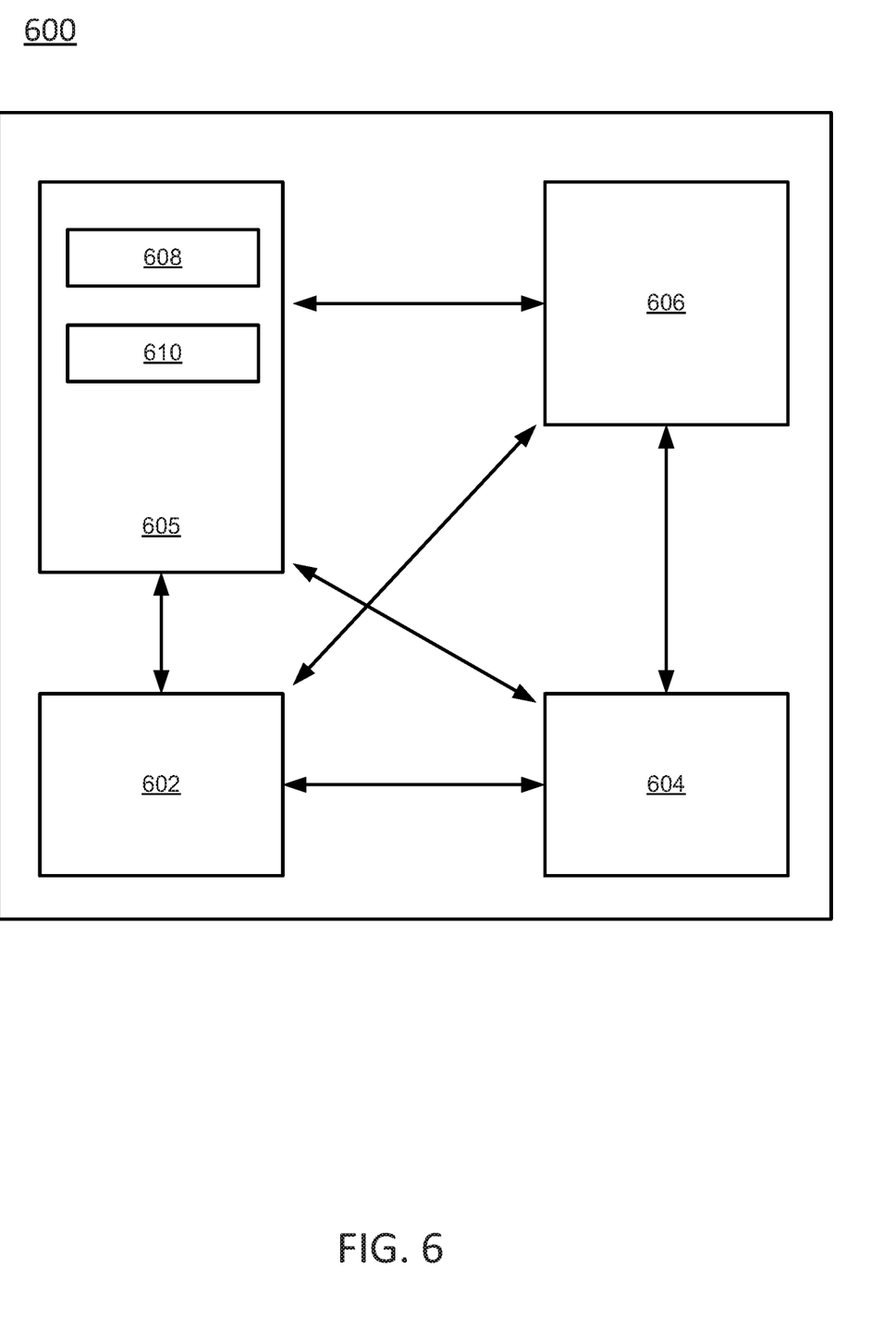
FIG. 6 depicts a high-level block diagram of an example computer that can be transformed into a machine capable of performing the functions described herein.

FIG. 6 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to detect an edge of a document using an invisible spectrum scan, as disclosed herein.

As depicted in FIG. 6, the computer 600 comprises a hardware processor element 602, e.g., a central processing unit (CPU), a microprocessor, or a multi-core processor, a memory 604, e.g., random access memory (RAM) and/or read only memory (ROM), a module 605 for detecting an edge of a document using an invisible spectrum scan, and various input/output devices 606, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 605 for detecting an edge of a document using an invisible spectrum scan, e.g., machine readable instructions can be loaded into memory 604 and executed by hardware processor element 602 to implement the blocks, functions or operations as discussed above in connection with the methods 200, 400, and 500. For instance, the module 605 may include a plurality of programming code components, including an invisible spectrum detection component 608 and an image generation component 610.

The invisible spectrum detection component 608 may be configured to detect light in invisible wavelengths that is reflected back from a document and a cover of a scanner device. For instance, the invisible spectrum detection component 608 may be configured to perform block 206 of the method 200 described above.

The image generation component 610 may be configured to generate a digital image based on reflectance information detected by the invisible spectrum detection component 608. For instance, the image generation component 610 may be configured to perform block 208 of the method 200 described above.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for detecting an edge of a document using an invisible spectrum scan, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. An apparatus, comprising:
a transparent platen;
a substrate positioned on one side of the platen and having substantially uniform reflective properties, a document positionable between the substrate and the platen;
an array of light sources positioned on an opposite side of the platen from the substrate and including a plurality of light sources that emits light in a visible spectrum and a light source that emits light in an invisible spectrum;
a sensor positioned on the opposite side of the platen from the substrate to detect reflected portions of the light in the visible spectrum and the light in the invisible spectrum; and
a processor to:
generate a first image of the document and the substrate from the reflected portions of the light in the invisible spectrum;
detect edges of the document in the first image based on differences in brightness between the reflected portions of the light off the document and the reflected portions of the light off the substrate;
generate a second image of the document and the substrate based on the reflected portions of the light in the visible spectrum; and correct the second image based on the detected edges in the first image.

2. The apparatus of claim 1, wherein the substrate has a light opaque color.

3. The apparatus of claim 1, wherein the light source that emits light in the invisible spectrum is an infrared emitter.

4. The apparatus of claim 1, wherein the light source that emits light in the invisible spectrum is an ultraviolet emitter.

5. The apparatus of claim 1, wherein the array of light sources is movable along a track to scan a length of the document.

6. The apparatus of claim 1, wherein the sensor is movable along a track.

7. A method, comprising:
- illuminating a document that is positioned between a sensor and a substrate having substantially uniform reflective properties, using light in an invisible spectrum wherein the illuminating the document using the light in the invisible spectrum exposes the document and the substrate to the light in the invisible spectrum;
- detecting a first portion of the light in the invisible spectrum reflected by the document and a second portion of the light in the invisible spectrum reflected by the substrate; and
- generating a first image of the document and the substrate that illustrates a difference in brightness between the first portion of the light in the invisible spectrum and the second portion of the light in the invisible spectrum;
- detecting edges of the document in the first image based on the difference in brightness;
- illuminating the document using light in a visible spectrum, wherein the illuminating the document using the light in the visible spectrum exposes the document and the substrate to the light in a visible spectrum;
- detecting a portion of the light in the visible spectrum that is reflected by the document and the substrate;
- generating a second image of the document and the substrate based on the portion of the light in the visible spectrum; and
- correcting the second image based on the detected edges in the first image.

8. The method of claim 7, wherein the document is exposed to the light in the invisible spectrum and to the light in the visible spectrum simultaneously.

9. The method of claim 7, wherein the document is exposed to the light in the invisible spectrum and to the light in the visible spectrum at different times.

10. The method of claim 7, the light in the invisible spectrum comprises infrared light.

11. A non-transitory machine-readable storage medium encoded with instructions executable by a processor, the machine-readable storage medium comprising:
- instructions to illuminate a document that is positioned between a sensor and a substrate having substantially uniform reflective properties, wherein the illuminating exposes the document and the substrate to light in an invisible spectrum;
- instructions to detect a first portion of the light in the invisible spectrum reflected by the document and a second portion of the light in the invisible spectrum reflected by the substrate;
- instructions to generate a first image that illustrates a difference in brightness between the first portion of the light in the invisible spectrum and the second portion of the light in the invisible spectrum;
- instructions to detect edges of the document in the first image based on the difference in brightness;
- instructions to illuminate the document, wherein the illuminating exposes the document and the substrate to light in a visible spectrum;
- instructions to detect a portion of the light in the visible spectrum that is reflected by the document and the substrate;
- instructions to generate a second image of the document based on the portion of the light in the visible spectrum; and
- instructions to correct the second image based on the detected edges in the first image.

* * * * *